(No Model.)
J. M. REID.
MANGER.
No. 492,473. Patented Feb. 28, 1893.
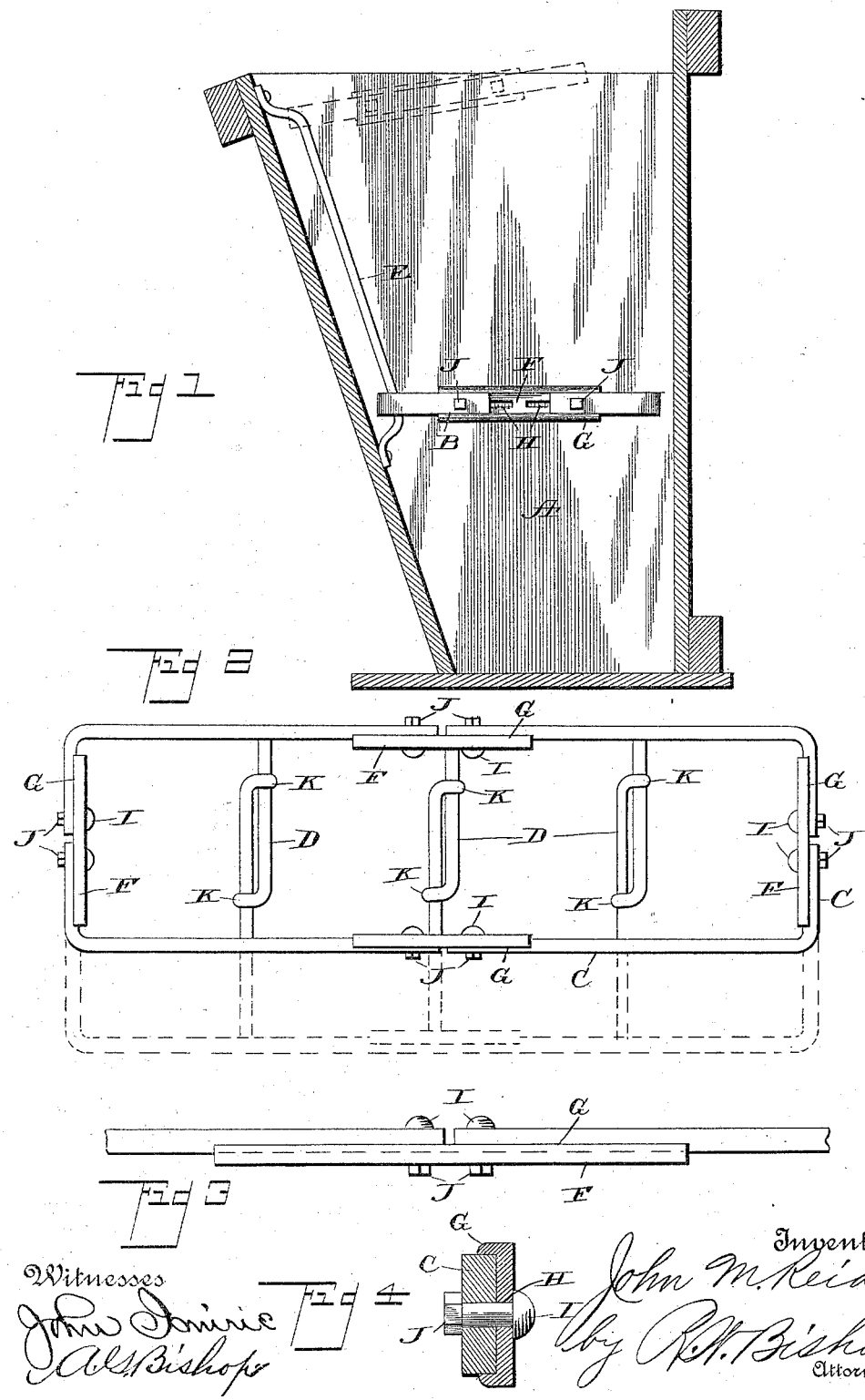

UNITED STATES PATENT OFFICE.

JOHN M. REID, OF JACKSONVILLE, ILLINOIS.

MANGER.

SPECIFICATION forming part of Letters Patent No. 492,473, dated February 28, 1893.

Application filed August 26, 1892. Serial No. 444,196. (No model.)

*To all whom it may concern:*

Be it known that I, JOHN M. REID, a citizen of the United States, residing at Jacksonville, in the county of Morgan and State of Illinois, have invented certain new and useful Improvements in Mangers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in feed-troughs and has especial reference to the provision of an attachment whereby the animal feeding from the trough will be prevented from pulling the hay or straw therefrom and consequently wasting the same.

The invention consists in a frame loosely held within a trough and adapted to rest on the hay or straw and cover the same, and in certain novel features of construction and arrangement as will be hereinafter fully described and claimed.

In the annexed drawings, Figure 1 is a sectional view of a feed trough, showing my attachment in position within the same. Fig. 2 is a plan view thereof and Figs. 3 and 4 are enlarged detail views.

The trough A may be of the usual or any preferred construction and, in itself, forms no part of my invention.

In carrying out my invention, I employ a guard frame B which is composed of the side and end bars C and the intermediate, transverse bars D, as clearly shown. These transverse bars D should be of such a number and arranged at such a distance apart as to permit the animals to feed freely and at the same time prevent them from pulling the hay or straw from the trough and thereby wasting the same. The frame is held loosely within the trough by means of the keepers E which are secured to one of the inner walls of the trough and pass through the frame as clearly shown in Figs. 1 and 2. This arrangement, which will be readily seen, permits the guard frame to be easily raised or lowered and even swung into a vertical position to permit the trough to be filled and, at the same time, will prevent the frame from being entirely removed from the trough.

In practice, the trough is filled in the usual manner and the guard frame is then swung downward so as to rest on the hay or straw. As the hay or straw is used the weight of the frame will cause it to fall so that it will at all times rest on the feed. It is obvious therefore, that the animals feeding from the trough will be prevented from scattering the feed and thereby wasting the same.

In order to secure the greatest efficiency, I make my frame adjustable so that it can be used upon any size of trough. In attaining this object I construct the side and end bars of L-shaped rods and connect the ends thereof by means of links F. The said links F have flanges G which engage the upper and lower edges of the side and end bars so as to prevent twisting or bending of the joints. The links are further provided with longitudinal slots H and bolts I are inserted through the said slots and the side and end bars and are provided with nuts J which are turned home against the side and end bars so as to secure the links thereto. It will be readily seen that by slightly loosening the nuts the ends of the side and end bars may be separated and that the bolts will be thereby moved along the slots in the link and the joint held intact. The nuts are then turned home so as to secure the parts in their adjusted positions. The nuts are not turned home entirely so as to bind against the frame but are arranged so as to permit a slight play of the links in order that the frame may collapse as it descends within the contracted trough.

In order that the transverse bars D may accommodate themselves to the adjustment of the guard frame I construct them in two members provided with hooks K on their inner ends which fit over the opposite member and thereby hold the two members together and at the same time permit them to move upon each other.

From the foregoing description it will be readily seen that the device can be easily and quickly adjusted so as to fit a trough of any size.

The advantages of the device are thought to be obvious and further reference thereto is considered unnecessary.

Having thus described my invention, what I claim, and desire to secure by Letters Patent, is—

1. The combination with the feed trough, of a guard frame held loosely therein and composed of side bars and transverse bars connecting said side bars, said transverse bars consisting of two members each provided at its inner end with a hook engaging the opposite member.

2. The combination with the feed trough, of a guard frame held loosely therein and composed of combined end and side bars, extensible transverse bars extending between the same, and links adjustably secured to the extremities of the end and side bars and connecting the same.

In testimony whereof I affix my signature in presence of two witnesses.

JOHN M. REID.

Witnesses:
CHARLES A. BARNES,
WILLIAM H. MCCARTHY.